US006405040B1

(12) United States Patent
Liu et al.

(10) Patent No.: US 6,405,040 B1
(45) Date of Patent: Jun. 11, 2002

(54) IMPLEMENTING AND SELECTING BETWEEN VIRTUAL PRIVATE WIRELESS TELECOMMUNICATIONS NETWORKS

(75) Inventors: Chung-Zin Liu; Robert Shaw Sellinger, both of Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/938,755

(22) Filed: Sep. 26, 1997

(51) Int. Cl.[7] .................................................. H04Q 7/20
(52) U.S. Cl. ........................ 455/435; 455/448; 455/552; 455/432; 455/525
(58) Field of Search .................................. 455/551, 552, 455/432, 433, 434, 448, 525, 515, 435, 462, 554, 555, 426, 524

(56) References Cited

U.S. PATENT DOCUMENTS

| 4,734,928 | A | * | 3/1988 | Weiner et al. | 379/357 |
|---|---|---|---|---|---|
| 5,159,625 | A | * | 10/1992 | Zicker | 455/432 |
| 5,442,806 | A | * | 8/1995 | Barber et al. | 455/435 |
| 5,504,803 | A | * | 4/1996 | Yamada et al. | 455/552 |
| 5,526,403 | A | * | 6/1996 | Tam | 455/426 |
| 5,586,338 | A | * | 12/1996 | Lynch et al. | 455/433 |
| 5,590,397 | A | * | 12/1996 | Kojima | 455/433 |
| 5,675,630 | A | * | 10/1997 | Beatty | 455/551 |
| 5,734,980 | A | * | 3/1998 | Hooper et al. | 455/434 |
| 5,761,618 | A | * | 6/1998 | Lynch et al. | 455/552 |
| 5,790,952 | A | * | 8/1998 | Seazholtz et al. | 455/432 |
| 5,818,918 | A | * | 10/1998 | Fujii | 379/167 |
| 5,903,832 | A | * | 5/1999 | Seppanen et al. | 455/435 |
| 5,905,953 | A | * | 5/1999 | Liu et al. | 455/435 |
| 5,918,172 | A | * | 6/1999 | Saunders et al. | 455/404 |
| 5,920,821 | A | * | 7/1999 | Seazholtz et al. | 455/466 |
| 5,943,332 | A | * | 8/1999 | Liu et al. | 455/435 |
| 5,949,770 | A | * | 9/1999 | Liu et al. | 370/329 |
| 6,002,679 | A | * | 12/1999 | Liu et al. | 370/335 |
| 6,085,085 | A | * | 7/2000 | Blakeney, II et al. | 455/426 |
| 6,085,110 | A | * | 7/2000 | Nilsson | 455/552 |
| 6,119,003 | A | * | 9/2000 | Kukkohovi | 455/435 |
| 6,128,489 | A | * | 10/2000 | Seazholtz et al. | 455/432 |

* cited by examiner

Primary Examiner—William Trost
Assistant Examiner—Rafael Perez-Gutierrez
(74) Attorney, Agent, or Firm—DeMont & Breyer, LLC; Jason Paul DeMont; Wayne S. Breyer

(57) ABSTRACT

A wireless terminal is disclosed that is capable of establishing a communications channel with either a public wireless network or a private wireless network on existing IS-95 CDMA facilities without changing the air interface or requiring the existence of independent private network facilities. Furthermore, a wireless terminal is disclosed that enables a user of a wireless terminal to affect which private wireless network the wireless terminal accesses, again on existing IS-95 facilities and without changing the air interface.

The wireless terminal comprises two or more lists of SID/NID signals: a default list and at least one override list. Both the default list and the override list provide a different preference for which public or private network the wireless terminal accesses when a call is placed from the wireless terminal. A switch in the wireless terminal advantageously causes the wireless terminal to use either the default list of SID/NID signals or one of the override lists of SID/NID signals. The switch can be activated either manually by the user or by inserting the wireless terminal into a cradle in accordance with the present invention.

12 Claims, 4 Drawing Sheets

IMPLEMENTING AND SELECTING BETWEEN VIRTUAL PRIVATE WIRELESS TELECOMMUNICATIONS NETWORKS

REFERENCE TO RELATED APPLICATIONS

This application is related to U.S. patent application Ser. No. 08/759,333, filed Dec. 2, 1996, entitled "A Method for Implementing Private Wireless Telecommunications Networks;" which is incorporated by reference as if it were set forth in its entirety.

FIELD OF THE INVENTION

The present invention relates to telecommunications in general, and, more particularly, to a method for implementing and selecting between virtual private wireless networks.

BACKGROUND OF THE INVENTION

In traditional telecommunications, most business and residential calls are carried by the telephone company over the public switched telephone network ("PSTN") whose facilities are shared by the general public. One traditional characteristic of the public switched telephone network is that the fees for using the network and the telephony features available (e.g., call forwarding, caller ID, etc.) on the network are generally uniform for to all of the users of the network. A government or large business that uses millions of dollars of telecommunications service per year, however, usually chooses to have its telecommunications traffic carried by a "private network." A private network is advantageous to the customer because it offers the customer substantial cost savings and enhanced telephony services in comparison to the public network.

Traditionally, a private telecommunications network comprised physically distinct equipment than the public network and was maintained and operated as if it were a separate, private telephone company. In contrast, technology has enabled the telephone company to offer "virtual" private network service, with its lower cost and enhanced telephone features, using the same equipment as the public switched telephone network. In general, virtual private network service is advantageous for the telephone company because it allows it to manage just one physical network and to enjoy the economies of scale afforded by one large network, in contrast to maintaining one smaller public network and numerous small private networks.

As public wireless telecommunications service based on CDMA becomes available, wireless service providers are increasingly interested in offering private wireless network service to select customers. Currently, only public network service is available based on CDMA. Furthermore, if a wireless service subscriber is offered the opportunity to place a call on either the public wireless network or on a private wireless network at any given time, it would be advantageous if the wireless service subscriber could affect, on an ad hoc basis, the choice of network used to place the call.

To do this, wireless service providers have two apparent options: (1) install a separate wireless network to service each private network, or (2) change the existing air interface standards to virtual private networks and make the concomitant hardware modifications to support the changes in the air interface. Both options are considered undesirable because of the huge expense associated with implementing either option.

SUMMARY OF THE INVENTION

Some embodiments of the present invention are capable of establishing a communications channel with multiple virtual wireless networks (e.g., a public network and/or one or more private networks) on a single wireless infrastructure without many of the costs and restrictions associated with methods in the prior art. For example, embodiments of the present invention are capable of establishing a communications channel with either a public wireless network or a private wireless network on existing IS-95 CDMA facilities without changing the air interface or requiring the existence of independent private network facilities. Furthermore, some embodiments of the present invention enable a user of a wireless terminal to affect which private wireless network the wireless terminal accesses, again on existing IS-95 facilities and without changing the air interface.

These results are obtained in an illustrative embodiment of the present invention that comprises two lists of SID/NID signals: a default list and an override list. Both the default list and the override list provide a different preference for which public or private network the wireless terminal accesses when a call is placed from the wireless terminal. In other words, the default list can cause a wireless terminal to attempt access to the public network before attempting to access either private network A or private network B, and the override list can cause the wireless terminal to attempt access to private network B, then access to the public network, and then to private network A. A switch in the wireless terminal advantageously causes the wireless terminal to use either the default list of SID/NID signals or the override list of SID/NID signals. The switch can be activated either manually or by inserting the wireless terminal into a cradle in accordance with the present invention.

Other embodiments of the present invention can comprise a default list of SID/NID signals and two or more override lists of SID/NID signals and a suitable mechanism for enabling a user to select between them. Advantageously, each override list prioritizes the SID/NID signals differently so that the user can precisely affect the private network it attempts to register on.

BRIEF DESCRIPTION OF THE DRAWINGS

FIG. 4 depicts a portion of a flowchart in accordance with an illustrative embodiment of the present invention, which is continued in FIG. 5.

FIG. 5 depicts a portion of a flowchart in accordance with an illustrative embodiment of the present invention, which was begun in FIG. 4.

DETAILED DESCRIPTION

Figure 1:
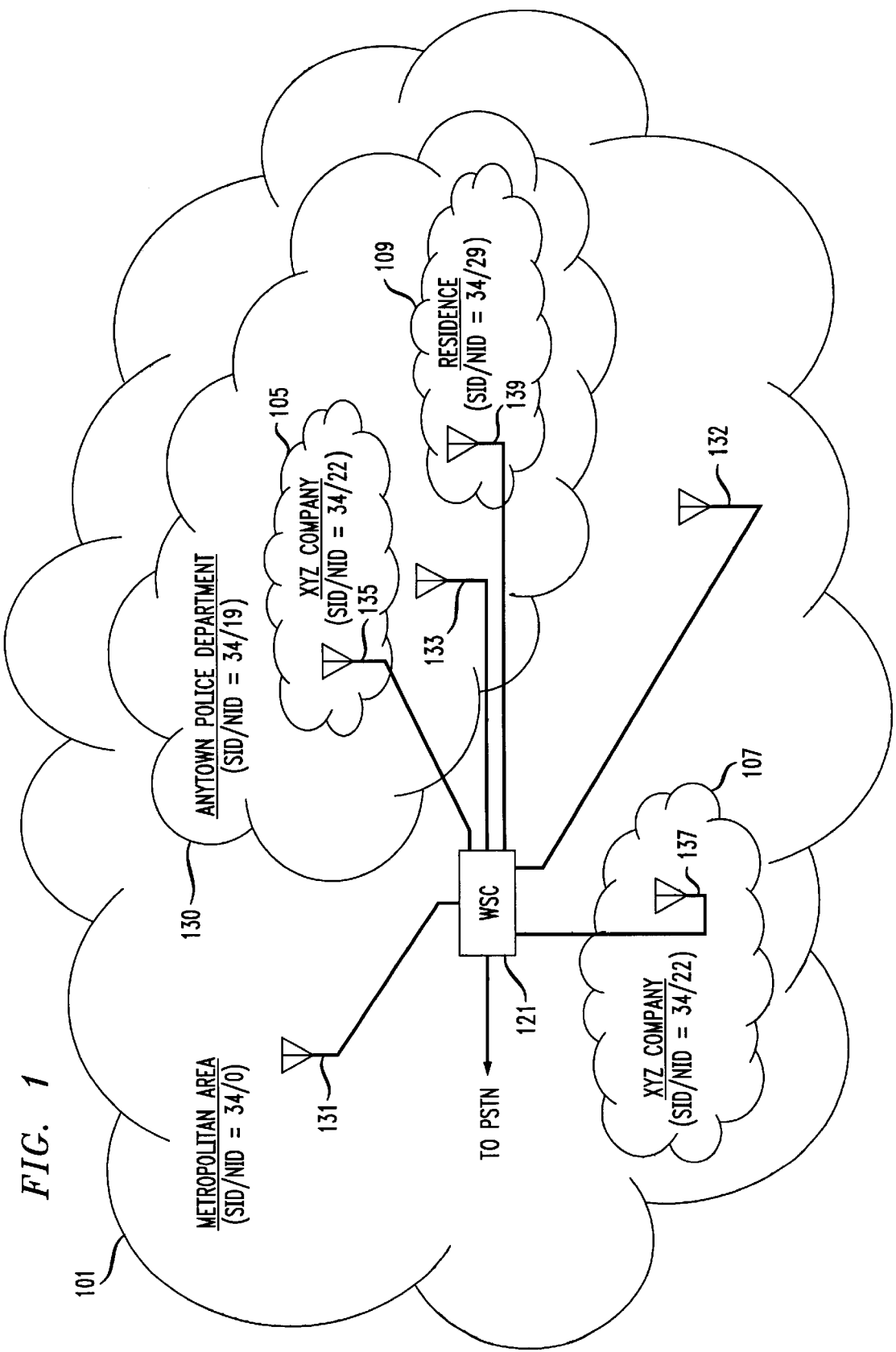
FIG. 1 depicts a map of an illustrative metropolitan area.

FIG. 1 depicts a map of an illustrative area, metropolitan area 101, which is serviced by a wireless telecommunications system in accordance with an illustrative embodiment of the present invention. Within area 101 is region 130, which depicts the area protected by the Anytown Police Department and serviced by the Anytown Police Department's private wireless network. Also within area 101 are campus 105 and building 107, which are owned by the XYZ Company and serviced by the XYZ Company private wireless network. Region 130 also comprises residence 109, which is serviced by its own private wireless network.

In accordance with the illustrative embodiment of the present invention, all of the private wireless networks within area 101 are virtual and depend on the shared use of the wireless telecommunications system's facilities. Also in accordance with the illustrative embodiment, the wireless telecommunication system advantageously also offers public wireless service within metropolitan area 101.

The heart of the wireless telecommunication system that services area 101 is wireless switching center 121. A plurality of wireless base stations (e.g., base stations 131, 132, 133, 135, 137 and 139) are geographically dispersed throughout area 101 and connected to wireless switching center 121. Wireless switching center 121 also provides access for the wireless telecommunications system to the public switched telephone network (now shown).

In accordance with the illustrative embodiment of the present invention, each CDMA radio associated with each base station in area 101 advantageously broadcasts a System Identification signal and a Network Identification signal on the Overhead Paging Channel. For the purposes of this specification, the combination of a System Identification signal and a Network Identification signal will be called a "SID/NID signal."

In accordance with the IS-95 and ANSI J_STD_008 CDMA air interface standards, the System Identification signal is associated with a unique wireless service system. For the purposes of this illustration, the System Identification for the wireless telecommunication system is 34. Although the IS-95 air interface standard provides for a Network Identification signal to be broadcast too, the standard does not strictly restrict how the signal is to be used or interpreted.

In accordance with the illustrative embodiment of the present invention, the combination of the System Identification signal and the Network Identification signal (i.e., the SID/NID signal) is used to partition, geographically and/or logically, a portion of the wireless telecommunications system into multiple virtual wireless networks (e.g., a public network and/or one or more private networks). Therefore, the combination of the System Identification and the Network Identification (i.e., the SID/NID signal) is needed to uniquely identify the public network or one of the private networks. For the purposes of the illustrative embodiment, the Network Identification for the public network is zero (0).

As shown in Table 1, the public wireless telecommunications network and each virtual private network are assigned a unique SID/NID signal.

TABLE 1

| Network | SID/NID Signal |
|---|---|
| Public Network | 34/0 |
| Anytown Police Department Private Network | 34/19 |
| XYZ Company Private Network | 34/22 |
| Residence Private Network | 34/29 |

As shown in FIG. 1, the wireless service provider and each entity sponsoring a private network must decide where, geographically, each private network's service will be available. According to the illustrative embodiment, the Anytown Police Department has decided that its private network should be available to its members when they are within region 130. The XYZ Company has decided that its private network should be available to its employees and customers when they are within campus 105 or building 107. It is important to note that the service area of a virtual network can be adjacent, overlaid or not adjacent to that of another network. The homeowner of residence 109 has decided that his private network should be available to the members of his family only when they are within their residence.

It is preferred that each geographic region serviced by the public network or a private network has one or more CDMA radios in that region that broadcast the SID/NID signal for that network and that provide service for that network. For example, base station 131 within metropolitan area 101 preferably has at least one CDMA radio that broadcasts the SID/NID C; signal 34/0 on the Overhead Paging Channel. Furthermore, base station 133 within region 130 preferably has at least one CDMA radio that broadcasts the SID/NID signal 34/19 on the Overhead Paging Channel and may also have one or more CDMA radios that broadcast the SID/NID signal 34/0 on the Overhead Paging Channel. And still furthermore, base station 135 preferably has at least one CDMA radio that broadcasts the SID/NID signal 34/22 and may also have one or more CDMA radios that broadcast the SID/NID signal 34/0 and/or the SID/NID signal 34/19. It will be clear to those skilled in the art how to assign radios throughout a geographic region so that multiple virtual networks can be implemented according to embodiments of the present invention.

Also in accordance with the illustrative embodiment, each virtual private network is partitioned into a plurality of "user zones" or "user groups," each of which has an associated set of telecommunications features and restrictions. Each sponsor of a private network must identify what user zones the private network will support, which wireless terminals will be allowed access to the private network and what user zone each wireless terminal will be afforded.

For the purposes of the illustrative embodiment, the wireless telecommunications system offers 9 user zones, numbered one (1) through nine (9). It will be clear to those skilled in the art how to implement and use user zones and how to implement and use the features and restrictions associated with those user zones.

Each sponsor of a private network must decide which of the offered user zones their private network will support, which wireless terminals will be allowed to use their private network and which user zones each wireless terminal will be afforded. Table 2 indicates which user zones XYZ Company's private network will support.

TABLE 2

XYZ Company's User Zones 1
4
7

Table 3 indicates which user zones Anytown Police Department's private network will support.

TABLE 3

Anytown Police Department's User Zones 2
3
4

Table 4 indicates which user zones Residence's private network will support.

TABLE 4

Residence's User Zones 1
6

Because access to private networks should be restricted, each wireless terminal contains one prioritized default list of the networks that it can access and one or more prioritized override lists. For example, an illustrative user "Alice" has a wireless terminal that contains a token of the wireless terminal's identity. That token is advantageously the Mobile Identification Number or "MIN." Alternatively, the token could be the electronic serial number ("ESN") or International Mobile Station Identification ("IMSI") of the wireless terminal. The MIN of Alice's wireless terminal is 708-604-7555. Furthermore, Alice has been granted access to the Anytown Police Department's private network and residence's private network. Table 5 depicts the prioritized default list of the networks to which Alice's wireless terminal has been granted access.

TABLE 5

Default List

| Network | SID/NID Signal |
| --- | --- |
| Residence | 34/29 |
| Anytown Police Department | 34/19 |
| Public Network | 34/0 |

When Alice's wireless terminal uses the default list of SID/NID signals (as shown in Table 5), her terminal will first attempt to access the Residence private network, and if that is not possible, then the Anytown Police Department private network, and if that is not possible, then the public network. The priority with which SID/NID signals are entered into the default list of SID/NID signals should be the priority that is appropriate for most of the time that Alice's wireless terminal is used.

There can be times, however, when it would be advantageous for Alice to temporarily alter the priority with which her wireless terminal attempts to access the public network and respective private networks. For example, if Alice were the Chief of Police of the Anytown Police Department and she wanted to place a police-related call while she was at home, the default list of SID/NID signals in Table 5 would attempt to place the call on the Residence private network. But because the call is police-related, she may prefer that the call be placed on the Anytown Police Department's private network. Therefore, to afford Alice some control over the priority with which her wireless terminal attempts to access the public network and private networks, Alice's wireless terminal advantageously contains one override list of SID/NID signals. Table 6 depicts the prioritized override list of the networks to which Alice's wireless terminal has been granted access.

TABLE 6

Override List

| Network | SID/NID Signal |
| --- | --- |
| Anytown Police Department | 34/19 |
| Public Network | 34/0 |
| Residence | 34/29 |

Other embodiments of the present invention can contain a plurality of override lists of SID/NID signals. For example, if Alice's terminal is permitted access to n different networks (presumably 1 public network and n−1 private networks), then there are potentially n! lists of SID/NID signals that prioritize access to the networks differently. In practice, it is believed that no more than n lists of override signals will be created.

When Alice's wireless terminal uses the override list of SID/NID signals (as shown in Table 6), her terminal first attempts to access the Anytown Police Department private networks, and if that is not possible, then the public network, and if that is not possible, then the Residence private network.

Figure 2:
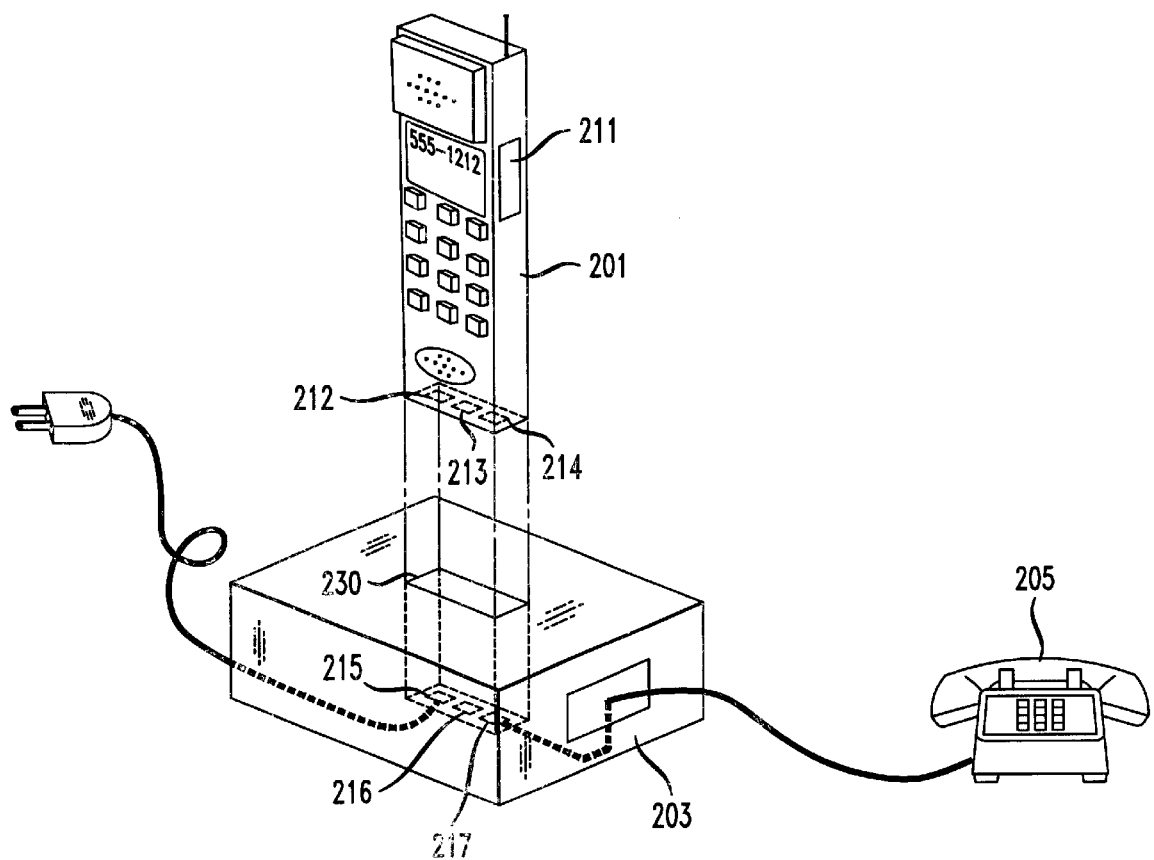
FIG. 2 depicts an isometric drawing of a wireless terminal, a cradle, and a wireline telephone in accordance with the illustrative embodiment of the present invention.
Figure 3:
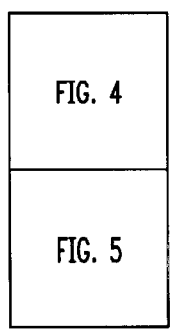
FIG. 3 illustrates how the sheets containing

FIG. 2 depicts an isometric drawing of Alice's wireless terminal, wireless terminal 201, above cradle 203 and wire-line telephone 205. Wireless terminal advantageously comprises a master SID/NID switch (now shown) that when activated causes the override list of SID/NID signals to be used instead of the default list of SID/NID signals. Advantageously, there are two alternative mechanisms for activating and deactivating the master SID/NID switch: (1) manual SID/NID switch 211, and cradle SID/NID switch 213. If either manual SID/NID switch 211 or cradle SID/NID switch 213 or both are activated, then the master SID/NID switch is activated and the override list of SID/NID signals is used instead of the default list of SID/NID signals. Analogously, both manual SID/NID switch 211 and cradle SID/NID switch 213 must be deactivated for the master SID/NID switch to be deactivated.

Manual SID/NID switch 211 is advantageously a binary switch on the housing of wireless terminal 201 that Alice can manually activate and deactivate as she desires. Cradle SID/NID switch 213 is advantageously a binary switch on the bottom of the wireless terminal 201 that is activated when wireless terminal 201 is inserted into cradle 203 and that is deactivated when wireless terminal 201 is removed from cradle 203. It will be clear to those skilled in the art how to make and use manual SID/NID switch 211 and cradle SID/NID switch 213.

Alternatively, when an embodiment of the present invention comprises a default list of SID/NID signals and more than one override list of SID/NID signals, manual SID/NID switch 211 is advantageously replaced with a multi-position mechanical switch or a series of soft switches on the keypad of wireless terminal 201 so that the user can scroll though each of the available lists on the terminal's display and then select the list that is used to request registration on the wireless telecommunications network. Furthermore, the override lists of SID/NID signals can themselves be prioritized by the user so that when wireless terminal 201 is place in cradle 203, the highest priority override list of SID/NID signals is used to request registration on the wireless telecommunications network. The motivating idea behind multiple override lists is to provide the user with the option of affecting which private network registration occurs on. It will be clear to those skilled in the art how to make and use wireless terminal 201 when it comprises two or more override lists of SID/NID signals.

Wireless terminal 201 is advantageously designed so that it can be inserted into aperture 230 of cradle 203 and so that power connector 212 on wireless terminal 201 connects with power connector 215 in cradle 203, telecommunications connector 214 on wireless terminal 201 connects with telecommunications connector 217 in cradle 203, and override connector 213 connects with override connector 216 in cradle 203. Power connectors 212 and 215 advantageously enable wireless terminal 201 to be powered and its batteries charged when wireless terminal 201 is in cradle 203. Telecommunications connectors 214 and 217 provide a tip-ring or ISDN interface for wireline telephone 205, which is a conventional wireline telephone in the prior art, so that wireline telephone 205 can communicate with a wireless telecommunications system via the radio equipment in wireless terminal 201. It will be clear to those skilled in the art how to make and use wireless terminal 201 so that it is capable of interfacing with wireline telephone 205 via the tip-ring or ISDN interface.

Override connectors 213 and 216 advantageously activate cradle SID/NID switch 213 when wireless terminal 201 is in cradle 203 and deactivate cradle SID/NID switch 213 when wireless terminal 201 is removed from cradle 203. It will be clear to those skilled in the art how to make and use cradle 203 and wireline telephone 205.

A home location register in the wireless telecommunications system advantageously contains a table that maps a wireless terminal's MIN (or alternatively a directory number associated with) to a prioritized list of the user zones that are available to that wireless terminal. Table 7 depicts a portion of such a table in accordance with the illustrative embodiment.

TABLE 7

| MIN (or DN) | Wireless Terminal Owner | Prioritized User Zone (Highest Priority First) |
|---|---|---|
| ... | ... | ... |
| 708-112-2345 | Ken | 1 |
| 708-115-2773 | Chung | 5, 4 |

TABLE 7-continued

| MIN (or DN) | Wireless Terminal Owner | Prioritized User Zone (Highest Priority First) |
|---|---|---|
| 708-604-7555 | Alice | 7, 4, 1 |
| ... | ... | ... |

The home location register also preferably contains a table that maps a wireless terminal's directory number or MIN to the set of features and restrictions that wireless terminal is provided. Table 8 depicts a portion of such a table.

TABLE 8

| MIN (or DN) | Privileges | Restrictions |
|---|---|---|
| ... | ... | ... |
| 564-675-3221 | Flat-rate billing; 4 digit dialing; caller ID; call forwarding; call waiting; three-way calling | None |
| 708-604-7555 | Flat-rate billing; 4 digit dialing; caller ID; call forwarding; call waiting | No international calls |
| 000-345-6678 | Flat-rate billing; 4 digit dialing; caller ID | No international calls; no evening calls |
| 000-345-6679 | Flat-rate billing; 4 digit dialing; caller ID | No long distance calls |
| ... | ... | ... |

And because each user afforded access to a private network on a given user zone should be afforded the same privileges and restrictions, regardless of what privileges and restrictions they would be afforded on the public network, a new table in accordance with the illustrative embodiment is created. As shown in Table 9, this table maps User Zones to a "pseudo" directory number which is a directory number that can never naturally occur according to the dialing plan. An entry is then made in Table 8 which uses the pseudo directory number as the index to determine what privileges and restrictions the user should be afforded.

TABLE 9

| User Zone | Pseudo Directory Number |
|---|---|
| ... | ... |
| 4 | 000-345-6678 |
| 5 | 000-345-6679 |
| 6 | 000-345-6680 |
| ... | ... |

Figure 4:
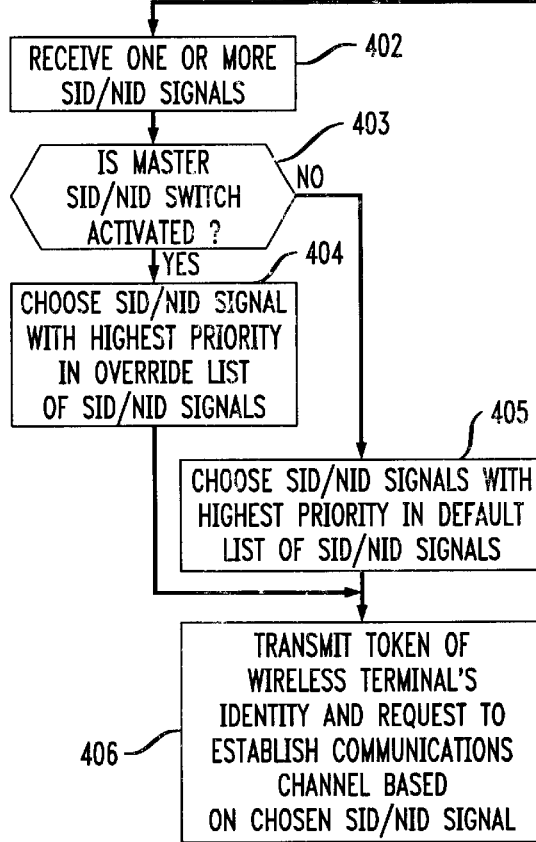
FIG. 4 and FIG. 5 are interrelated.
Figure 5:
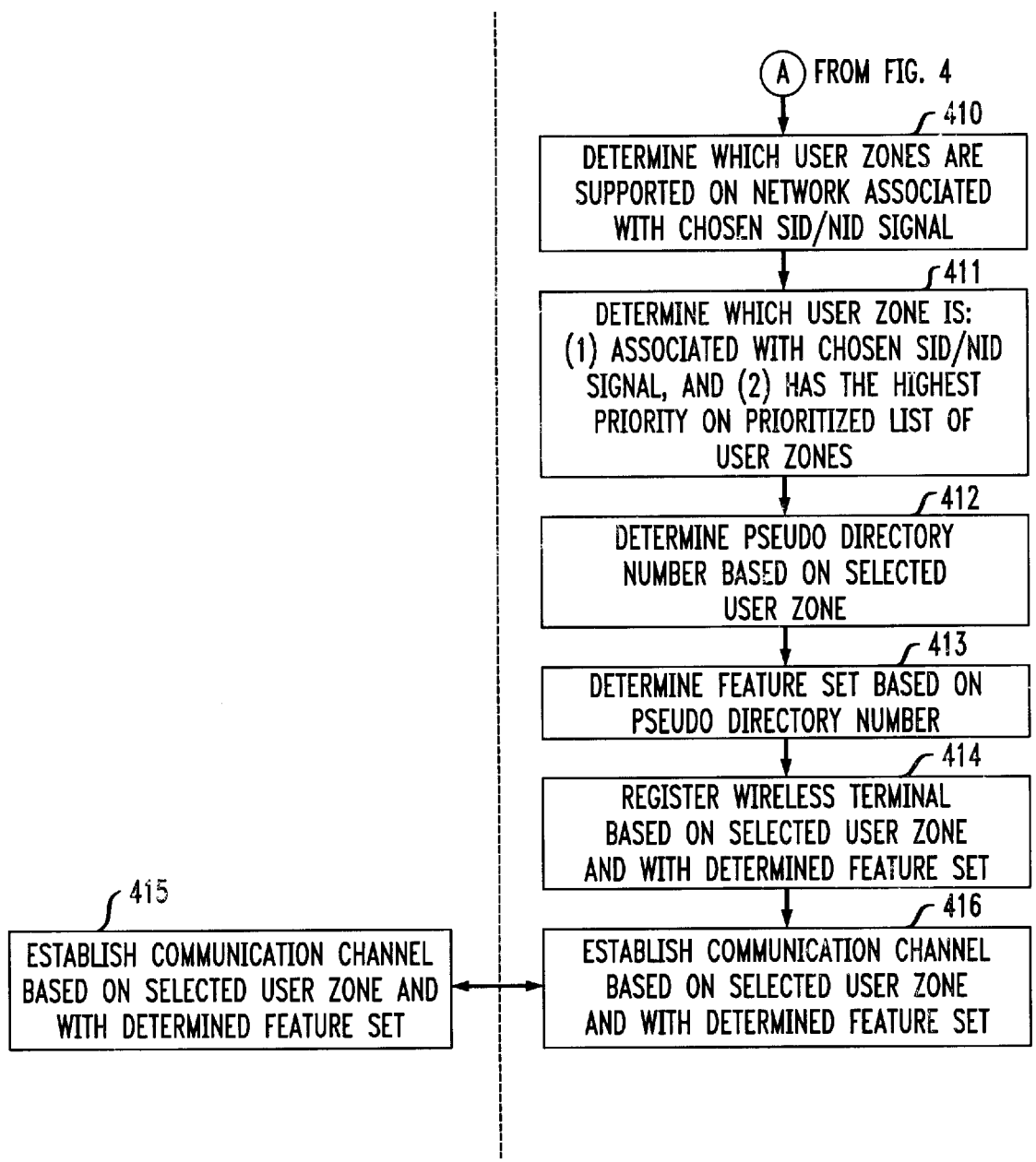

FIGS. 4 and 5 depict a flowchart in accordance with the illustrative embodiment of the present invention. For pedagogical purposes, the illustrative embodiment of the present invention will be described in terms of how it operates to provide service to the user "Alice" when she is within residence 109, yet desires to place a call in the Anytown Police Department private network.

It can be observed from the above Tables 3 and 7 that Alice has been granted User Zone 7 access to Anytown Police Department's network and User Zone 1 access to Residence's private network. By default Alice's wireless terminal, which has the MIN 708-604-7555, has been programmed to attempt access to, in order of priority: Residence's private network, Anytown Police Department's private network, and then the public network. But because Alice desires to place a call in the Anytown Police Department private network, she manually activates manual SID/NID switch 211, which causes the override list of SID/NID signals in Table 6 to be used instead of the default list of SID/NID signals. Alice has not been granted access to the XYZ Company's private network, and, therefore, the XYZ Company's private network SID/NID signal does not appear in either the default list of SID/NID signals or the override list of SID/NID signals.

As shown in FIG. 4 at step 401, the wireless telecommunication system broadcasts an SID/NID signal associated with a virtual network into those areas serviced by that virtual network on the Overhead Paging Channel. Specifically, one or more CDMA radios at base stations 131, 132, 133, 135, 137, and 139 broadcast the SID/NID signal 34/0 throughout area 101 to indicate the availability of public wireless service throughout area 101. One or more CDMA radios at base stations 133, 135, and 139 broadcast the SID/NID signal 34/19 throughout region to indicate the availability of service on the Anytown Police Department's private network. One or more CDMA radios at base stations 135 and 137 broadcast the SID/NID signal 34/22 throughout campus 105 and building 107 to indicate the availability of service on the XYZ Company's private network. And one or more CDMA radios at base station 139 broadcast the SID/NID signal 34/29 to indicate the availability of service on the residence's private network.

Because Alice is within residence 109, her wireless terminal receives at step 402, via the Overhead Paging Channel, three SID/NID signals: 34/0, 34/19 and 34/29.

At step 403, Alice's wireless terminal determines whether the master SID/NID switch is activated. Because Alice has activated manual SID/NID switch 211, master SID/NID switch is activated and control passes to step 404; otherwise control would have passed to step 405.

At step 404, Alice's wireless terminal determines that according to the override list of SID/NID signals, Alice's wireless terminal's first preference is to access Anytown Police Department's private network (i.e., SID/NID signal 34/19). Because her wireless terminal does receive SID/NID signal 34/29, her wireless terminal chooses it, as shown at step 404.

At step 406, Alice's wireless terminal then transmits (1) a token of the wireless terminal's identity, preferably its MIN, and (2) a request to establish a communications channel based on SID/NID signal 34/29.

At step 407, the wireless telecommunications system receives the token of the wireless terminal's identity (MIN=708-604-7555) and the request to establish the communications channel based on SID/NID signal 34/19.

At step 408, the wireless telecommunications system transmits the token of the wireless terminal's identity (MIN=708-604-7555) to that terminal's home location register. In response, at step 409, the system receives from the home location register a prioritized list of user zones. From Table 7, it can see that the prioritized list of user zones for Alice's wireless terminal is 7, 4, and 1.

At step 410 in FIG. 5, the wireless telecommunications system determines (from Table 3) that the Anytown Police Department's private network supports user zones 2,3 and 4. At step 411, the system determines which of the supported user zones has the highest priority on Alice's prioritized list. The highest priority user zone on Alice's prioritized list is 7. But since that user zone is not supported by the Anytown Police Department private network, it is not used. The next highest priority user zone on Alice's prioritized list is 4, which is supported by the Anytown Police Department network.

Next, in accordance with step 412 and Table 9, a pseudo directory number is determined. Because it has been determined that the user zone for this communication channel is User Zone 4, Table 9 provides the pseudo directory number 000-345-6678. In accordance with step 413, the pseudo directory number 000-345-6678 is advantageously used as an index into Table 8 to determine the feature set that the communication channel with Alice's wireless terminal will be afforded. From Table 8, it can be seen that the call should be afforded flat-rate billing, 4 digit dialing and caller ID, but that there should be no international or evening calls.

In accordance with step 414, the wireless telecommunications system registers the wireless terminal based on the selected user zone, User Zone 4 and with the determined feature set, in well known fashion.

In accordance with steps 415 and 416, a communication channel is subsequently established based on the selected user zone, User Zone 4, and the above feature set.

It is to be understood that the above-described embodiments are merely illustrative of the invention and that many variations may be devised by those skilled in the art without departing from the scope of the invention. It is therefore intended that such variations be included within the scope of the following claims.

What is claimed is:

1. A wireless terminal comprising:
   a default list of system identification and network identification signals;
   a first override list of system identification and network identification signals;
   a second override list of system identification and network identification signals; and
   a switch for selecting which of said default list of system identification and network identification signals, said first override list of system identification and network identification signals, and said second override list of system identification and network identification signals said wireless terminal uses in attempting to request registration on a wireless telecommunications network.

2. The wireless terminal of claim 1 wherein said switch is activated and deactivated manually.

3. The wireless terminal of claim 1 wherein said switch is mechanical.

4. A cradle comprising:
   a receptacle for receiving a wireless terminal at contains a default list of system identification and network identification signals and an override list of system identification and network identification signals; and
   a first connector for interfacing with said wireless terminal and for causing said override list of system identification and network identification signals to be used over said default list of system identification and network identification signals in said wireless terminal when said wireless terminal is in said receptacle.

5. The cradle of claim 4 further comprising a second connector for interfacing with a wireline terminal and for enabling said wireline terminal to communicate with a wireless telecommunications network via said wireless terminal.

6. The cradle of claim 4 further comprising a second connector for providing power and ground to said wireless terminal.

7. A wireless terminal comprising:

a default list of system identification and network identification signals;

an override list of system identification and network identification signals; and a switch that when activated causes said default list of system identification and network identification signals to be used over said override list of system identification and network identification signals, and that when deactivated causes said override list of system identification and network identification signals to be used over said default list of system identification and network identification signals.

8. The wireless terminal of claim 1 wherein said switch is deactivated by inserting said wireless terminal into a cradle and activated by removing said wireless terminal from said cradle.

9. The wireless terminal of claim 1 wherein said switch is activated and deactivated manually.

10. A method of operating a wireless terminal, said method comprising:

when a switch is in a first position, using a default list of system identification and network identification signals to request registration on a wireless telecommunications network;

when said switch is in a second position, using a first override list of system identification and network identification signals to request registration on said wireless telecommunications network; and when said switch is in a third position, using a second override list of system identification and network identification signals to request registration on said wireless telecommunications network.

11. A method of operating a wireless terminal, said method comprising:

when a switch has been activated, using a default list of system identification and network identification signals to request registration on a wireless telecommunications network; and when said switch has been deactivated, using an override list of system identification and network identification signals to request registration on said wireless telecommunications network.

12. The method of claim 11 further comprising deactivating said switch by placing said wireless terminal in a cradle.

* * * * *